(12) United States Patent
Wasson

(10) Patent No.: US 9,440,186 B2
(45) Date of Patent: Sep. 13, 2016

(54) DRYING APPARATUS

(71) Applicant: Stacy L. Wasson, Tyler, TX (US)

(72) Inventor: Stacy L. Wasson, Tyler, TX (US)

( * ) Notice: Subject to any disclaimer, the term of this patent is extended or adjusted under 35 U.S.C. 154(b) by 262 days.

(21) Appl. No.: 14/290,246

(22) Filed: May 29, 2014

(65) Prior Publication Data

US 2015/0343371 A1 Dec. 3, 2015

(51) Int. Cl.
*B01D 53/02* (2006.01)
*B01D 53/26* (2006.01)
*B01D 53/04* (2006.01)

(52) U.S. Cl.
CPC ......... *B01D 53/261* (2013.01); *B01D 53/0407* (2013.01); *B01D 2259/4541* (2013.01)

(58) Field of Classification Search
CPC ............... B01D 2259/4541; B01D 53/0407; B01D 53/261
See application file for complete search history.

(56) References Cited

U.S. PATENT DOCUMENTS

| | | | |
|---|---|---|---|
| 4,096,640 A * | 6/1978 | Krambrock | B01D 53/08 34/369 |
| 4,434,514 A | 3/1984 | Sundahl et al. | |
| 4,498,202 A | 2/1985 | Yamamoto | |
| 5,245,994 A | 9/1993 | Chang et al. | |
| 5,836,362 A * | 11/1998 | Ackley | B01D 53/0407 141/100 |
| 5,855,652 A * | 1/1999 | Talley | B03C 3/014 95/60 |
| 6,325,113 B1 * | 12/2001 | Hathaway | B65B 1/32 141/83 |
| 6,553,687 B1 | 4/2003 | Leamon, Jr. | |
| 6,558,457 B1 * | 5/2003 | Kolczyk | B60T 17/004 55/318 |
| 6,931,755 B1 * | 8/2005 | Hsu | B01D 53/261 34/218 |
| 8,540,809 B2 * | 9/2013 | Minato | B01D 53/0415 123/198 E |
| 2005/0133942 A1 * | 6/2005 | Schuld | F24F 6/043 261/106 |
| 2007/0119206 A1 * | 5/2007 | Choi | F24F 3/1423 62/411 |
| 2008/0035569 A1 * | 2/2008 | Wilder | C02F 1/003 210/650 |
| 2009/0133426 A1 * | 5/2009 | Kim | F24F 3/1423 62/271 |
| 2010/0059358 A1 * | 3/2010 | Ritchey | A61L 2/10 203/10 |
| 2012/0043229 A1 | 2/2012 | Salys | |
| 2012/0174293 A1 | 7/2012 | Milliren et al. | |
| 2013/0185843 A1 | 7/2013 | Rahm | |
| 2014/0290251 A1 * | 10/2014 | Sugasawa | F23K 1/00 60/670 |

* cited by examiner

*Primary Examiner* — Christopher P Jones
(74) *Attorney, Agent, or Firm* — Dale J. Ream

(57) ABSTRACT

A drying apparatus for use with moisture absorbing crystals that draw moisture out of ambient air includes a main reservoir having a continuous side wall defining an interior area configured to contain the moisture absorbing crystals, the main reservoir having a bottom wall defining an outlet aperture. A collection reservoir is adjacent the bottom wall of the main reservoir, the collection reservoir defining an open top in operative communication with the outlet aperture of the main reservoir. A funnel member is situated intermediate the bottom wall of the main reservoir and the collection reservoir, the funnel member configured to receive and direct a moisture stream generated by the moisture absorbing crystals from the outlet aperture into the collection reservoir.

18 Claims, 9 Drawing Sheets

DRYING APPARATUS

BACKGROUND OF THE INVENTION

This invention relates generally to drying devices and, more particularly, for a drying apparatus for use in drying the padding of athletic headwear that is saturated with perspiration.

Many sports require or encourage players to wear various forms of headgear for safety purposes. For instance, football players, hockey players, and baseball players wear helmets as head protection. Each helmet includes foam padding that is typically covered with a layer of fabric. As a player perspires during practice or a ball game, the fabric and foam padding may become moist or even soaked with perspiration. The padding may generate a foul odor and be uncomfortable for a player to rest his head against. After practice or game play, a player may seek to launder the sweat-soaked padding and then dry it to be ready for a next use.

Various products exist and various patent proposals have been made available concerning drying wet or dampened materials. Although assumably effective for their intended purposes, the prior art does not show clear teaching of a drying apparatus upon which the head gear itself may rest or be supported thereon and that includes the use of moisture absorbing crystals positioned to absorb moisture from the head gear.

Therefore, it would be desirable to have a drying apparatus having a main reservoir that is configured to support a helmet and to contain a plurality of moisture absorbing crystals such that the crystals absorb the moisture out of the perspiration soaked helmet padding. Further, it would be desirable to have a drying apparatus having a funnel for collecting the moisture absorbed from the helmet padding and for depositing the collected moisture into a collection reservoir for disposal. In addition, it would be desirable to have a drying apparatus whose size is adjustable to support helmets of different sizes that are in need of being dried.

SUMMARY OF THE INVENTION

A drying apparatus for use with moisture absorbing crystals that draw moisture out of ambient air according to the present invention includes a main reservoir having a continuous side wall defining an interior area configured to contain the moisture absorbing crystals, the main reservoir having a bottom wall defining an outlet aperture. A collection reservoir is adjacent the bottom wall of the main reservoir, the collection reservoir defining an open top in operative communication with the outlet aperture of the main reservoir. A funnel member is situated intermediate the bottom wall of the main reservoir and the collection reservoir, the funnel member being configured to receive and direct a moisture stream generated by the moisture absorbing crystals from the outlet aperture into the collection reservoir.

Therefore, a general object of this invention is to provide a drying apparatus configured to support a helmet having fabric or padding that needs to be dried and configured to receive moisture absorbing crystals that draw moisture out of the fabric or padding.

Another object of this invention is to provide is to provide a drying apparatus, as aforesaid, having a funnel that receives moisture drawn out of the fabric or padding and directs it into a collection reservoir for disposal.

Still another object of this invention is to provide a drying apparatus, as aforesaid, in which the main reservoir that supports the piece of head gear being dried defines a plurality of slits through which moisture from the helmet and the moisture absorbing crystals are in fluid communication.

Yet another object of this invention is to provide a drying apparatus, as aforesaid, in which the main reservoir is adjustable to support helmets of different sizes.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4a is a front view of the drying apparatus as in FIG. 1;

FIG. 4b is a sectional view taken along line 4b-4b of FIG. 4a;

FIG. 8a is a sectional view taken along the line 8a-8a of FIG. 7a;

DESCRIPTION OF THE PREFERRED EMBODIMENT

Figure 1:
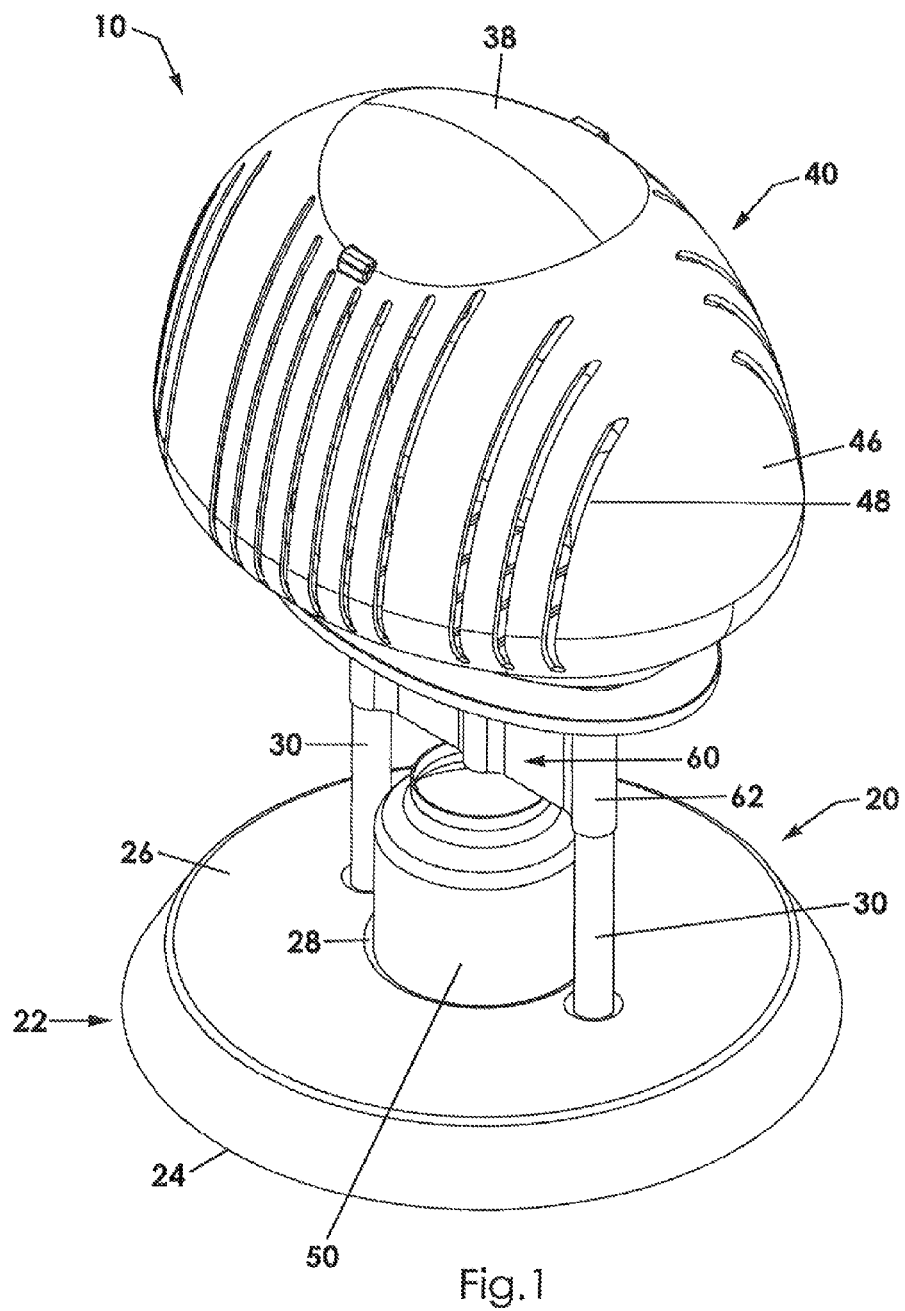
FIG. 1 is a perspective view of a drying apparatus according to a preferred embodiment of the present invention, illustrated with access doors in a closed configuration.

A drying apparatus according to a preferred embodiment of the present invention will now be described with reference to FIGS. 1 to 9 of the accompanying drawings. One embodiment of the drying apparatus 10 includes a main reservoir 40 configured to hold moisture absorbing crystals, a collection reservoir 50, a funnel member 60 configured to direct collected moisture to the collection reservoir 50, and a framework 20.

The framework 20 includes a base 22 and at least one support member 30 extending upwardly therefrom. More particularly, the base 22 includes a lower surface 24 and an upper surface 26. The lower and upper surfaces have generally planar configurations and are generally parallel to one another. The lower surface 24 is configured to rest upon a support surface, such as a table or countertop or even the floor and to support the rest of the apparatus 10. The upper surface 26 defines a recessed portion 28 configured to securely receive the collection reservoir 50 as will be described later.

The at least one support member 30 preferably includes a tubular rod having a lower end 32 coupled to the upper surface 26 of the base 22 and an opposed upper end 34. The support member 30 may have a hollow construction configured to receive other components as will be described later. In one embodiment, the support member 30 may include a pair of upstanding tubular support members 30 (FIG. 3), a lower end 32 of each being coupled to the upper surface 26 of the base 22, such as on opposed sides of the recessed portion 28.

The main reservoir 40 includes a bottom wall 42 and a continuous side wall 46 extending upwardly therefrom. In one embodiment, the main reservoir 40 has a shape configuration like that of a football and may also be referred to as a frustoconical configuration. The bottom wall 42 and side wall 46 together define an interior area; in other words, the main reservoir 40 may be hollow and configured to receive a plurality of moisture absorbent crystals (not shown) therein that are capable of absorbing moisture in the surrounding or ambient air. The bottom wall 42 defines at least one aperture 44 through which moisture may drain out of the main reservoir 40 and be collected into the collection reservoir 50 as will be described in more detail later. The aperture 44 is illustrated as a plurality of spaced apart apertures in an alternative embodiment shown in FIGS. 8a and 8b.

The collection reservoir 50 may be a jar, cup, or other container capable of collecting water that been absorbed out of the air. The collection reservoir 50, therefore, may include a bottom, a side wall, and may define an open top and open interior space. Preferably, the dimensions of the collection reservoir 50 are complementary to the configuration of the recessed portion 28 of the upper surface 26 of the base 22 so that it may be positioned therein.

Figure 3:
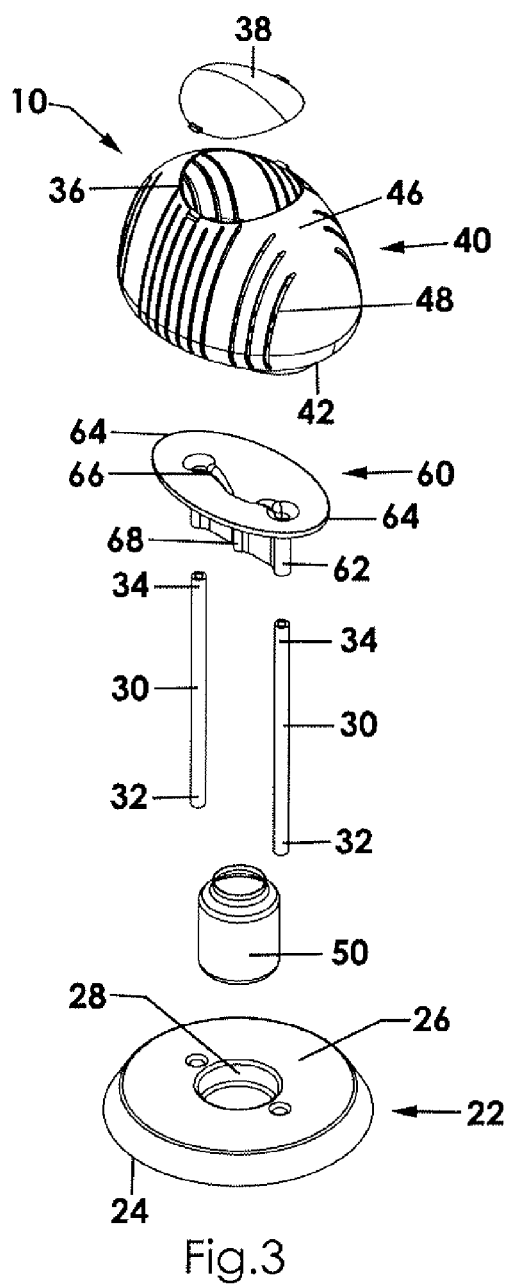
FIG. 3 is an exploded view of the drying apparatus as in FIG. 1.

The funnel member 60 is situated between the collection member 50 and the outlet aperture 44 of the main reservoir 40, the funnel member 60 being configured to collect and direct moisture absorbed and collected by the moisture absorbent crystals in the main reservoir 40. More particularly, the funnel member 60 may include one or more attachment portions 62 that are coupled to respective upper ends 34 of the support members 30. Namely, each attachment portion 62 may have a tubular configuration that may be slidably coupled to an upper end 34 of the support member or members, respectively (FIG. 3). When coupled to the support members 30, the funnel member 60 is upwardly displaced from the base 22.

Figures 4A, 4B:
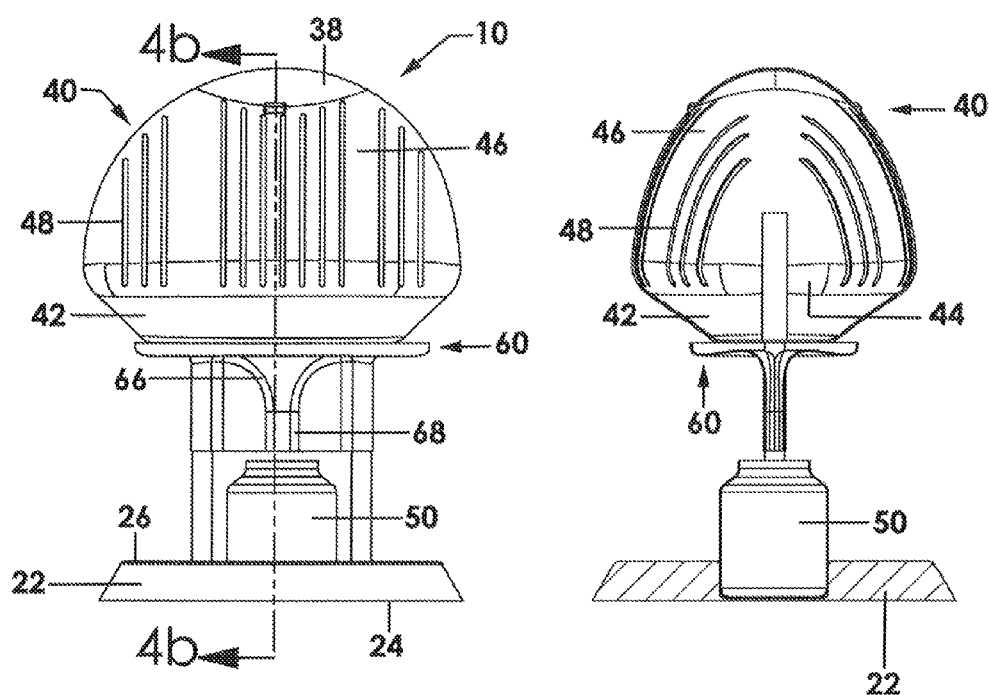

The funnel member 60 includes opposed lateral edges 64. The funnel member 60 defines a moisture collection channel 66 situated and extending substantially between the lateral edges 64, the collection channel 66 being configured to slope downwardly and inwardly so as to converge to define a funnel outlet 68 (FIG. 4b). As will be described later, the funnel member 60 is designed to collect moisture from multiple points in the bottom wall 42 of the main reservoir 40 and direct it to the collection reservoir 50.

As shown throughout the drawings, the side wall 46 of the main reservoir 40 may define a plurality of slits 48, each configured to allow ambient air to be received into the interior area of the main reservoir 40 so as to interact with respective moisture absorbing crystals. Preferably, each slit 48 has an elongate configuration and is spaced apart from any other slit 48. As will be described later, a football helmet (not shown) having sweat soaked padding may be situated atop the main reservoir 40 so that the moisture therein will be absorbed by the crystals positioned inside the main reservoir 40. As moisture is drawn out of the helmet, respective crystals absorb the moisture and break down, the resulting stream of combined moisture and crystal draining from the outlet aperture(s) of the main reservoir 40 and into the funnel member 60. In addition, it is understood that the main reservoir 40 may be configured to receive and hold a helmet. Preferably, the side wall 46 of the main reservoir 40 may include a downwardly increasing exterior diameter or perimeter dimension that is suited to receive a hat or helmet thereon.

Figure 2:
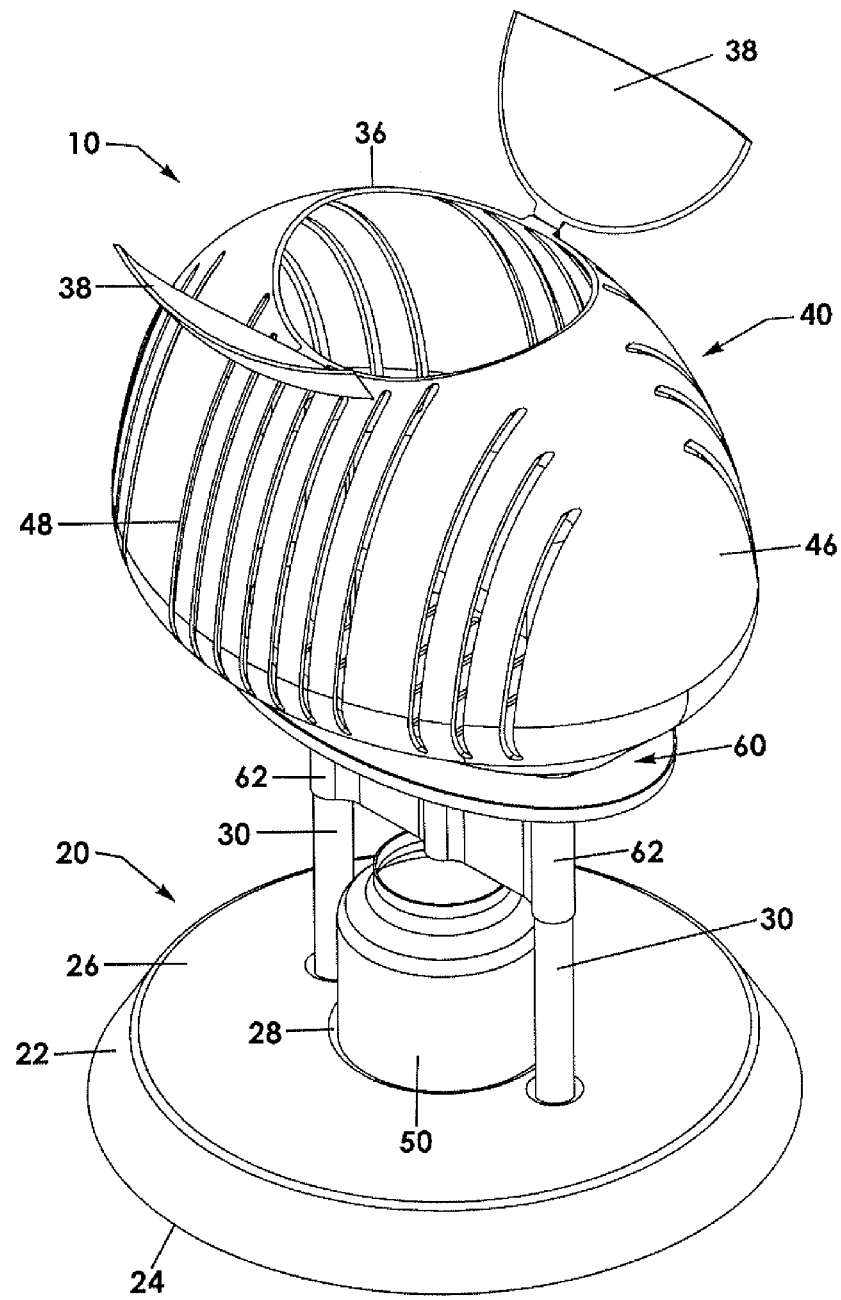
FIG. 2 is another perspective view of the drying apparatus as in FIG. 1, illustrated with the access doors in an open configuration.

In another aspect, the side wall 46 of the main reservoir 40 may define an open top 36 (FIG. 2). The open top 36 generally provides selective access to the interior area of the main reservoir 40, such as to insert moisture absorbent crystals. The main reservoir 40 may also include at least one door 38 pivotally coupled to the side wall 46 for providing selective access to the interior area. The door or pair of doors may be attached with hinges although other fasteners may also work. More particularly, the door 38 is movable between an open configuration allowing access to the interior area through the open top 36 (FIG. 2) and a closed configuration preventing access to the interior area through the open top 36 (FIG. 1)

In use, a user may open the door 38 to the main reservoir 40 and insert a plurality of moisture absorbing crystals (not shown). Then, a helmet or other hat having sweat-soaked padding in need of being dried out may be positioned atop the main reservoir 40. It is understood that the moisture is carried by ambient air into the interior area through the slits 48. As the crystals absorb the moisture, they essentially "melt" and the combination of sweat and crystal composition drains out the outlet aperture 44 and into the funnel member 60. As described above, the funnel member 60 directs the moisture stream into the collection reservoir 40 which may then be removed, emptied, and used again.

A drying apparatus 100 according to another embodiment of the invention is shown in FIGS. 5 to 9 and includes a construction substantially similar to the apparatus described above except as specifically noted below. In this embodiment, a main reservoir 110 includes a construction that enables the apparatus 100 to retain headgear of different sizes. In other words, the main reservoir 110 may be modified to retain helmets from small to large as needed or desired.

Figure 5:
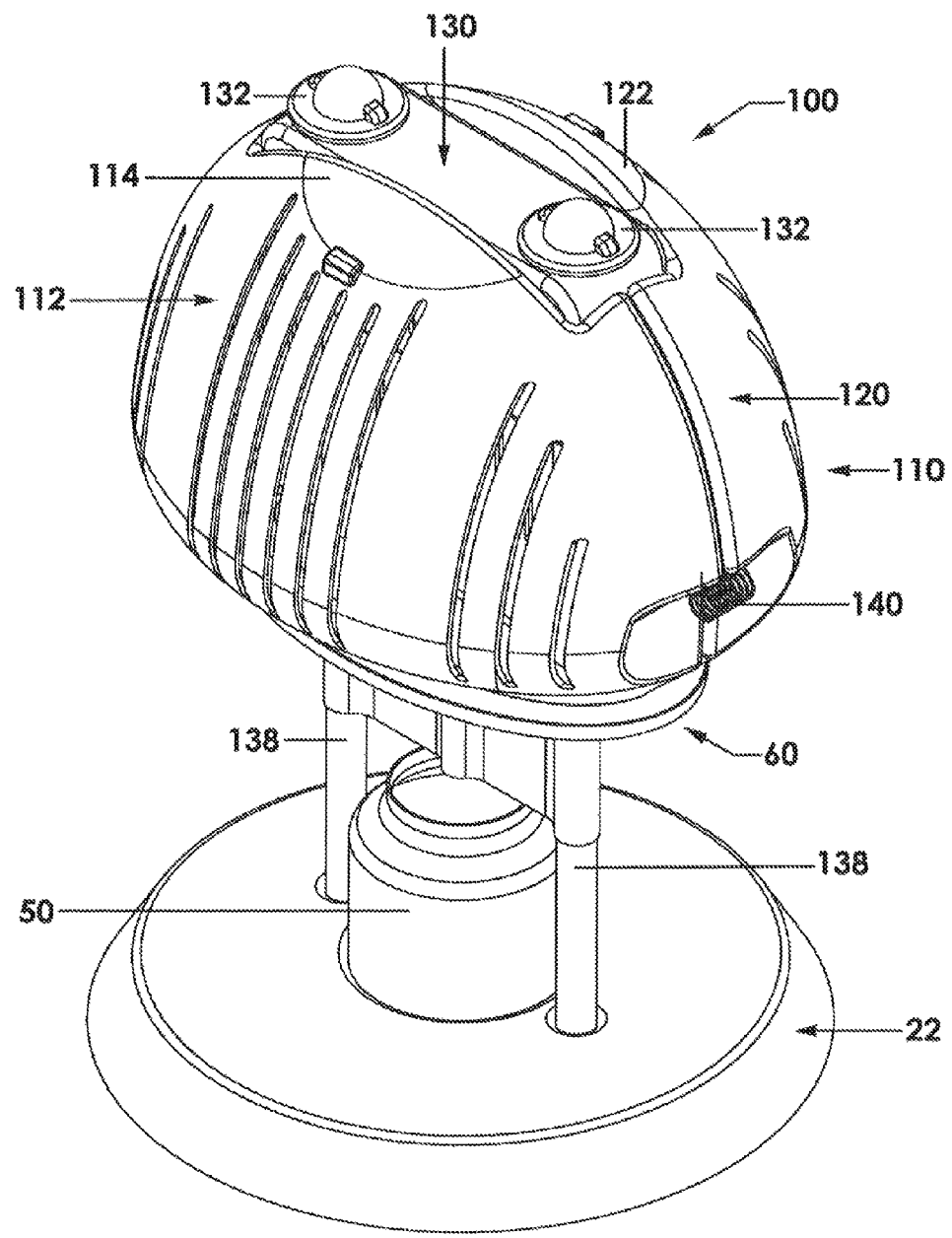
FIG. 5 is a perspective view of a drying apparatus according to another embodiment of the present invention, illustrated in a retracted configuration.
Figure 6:
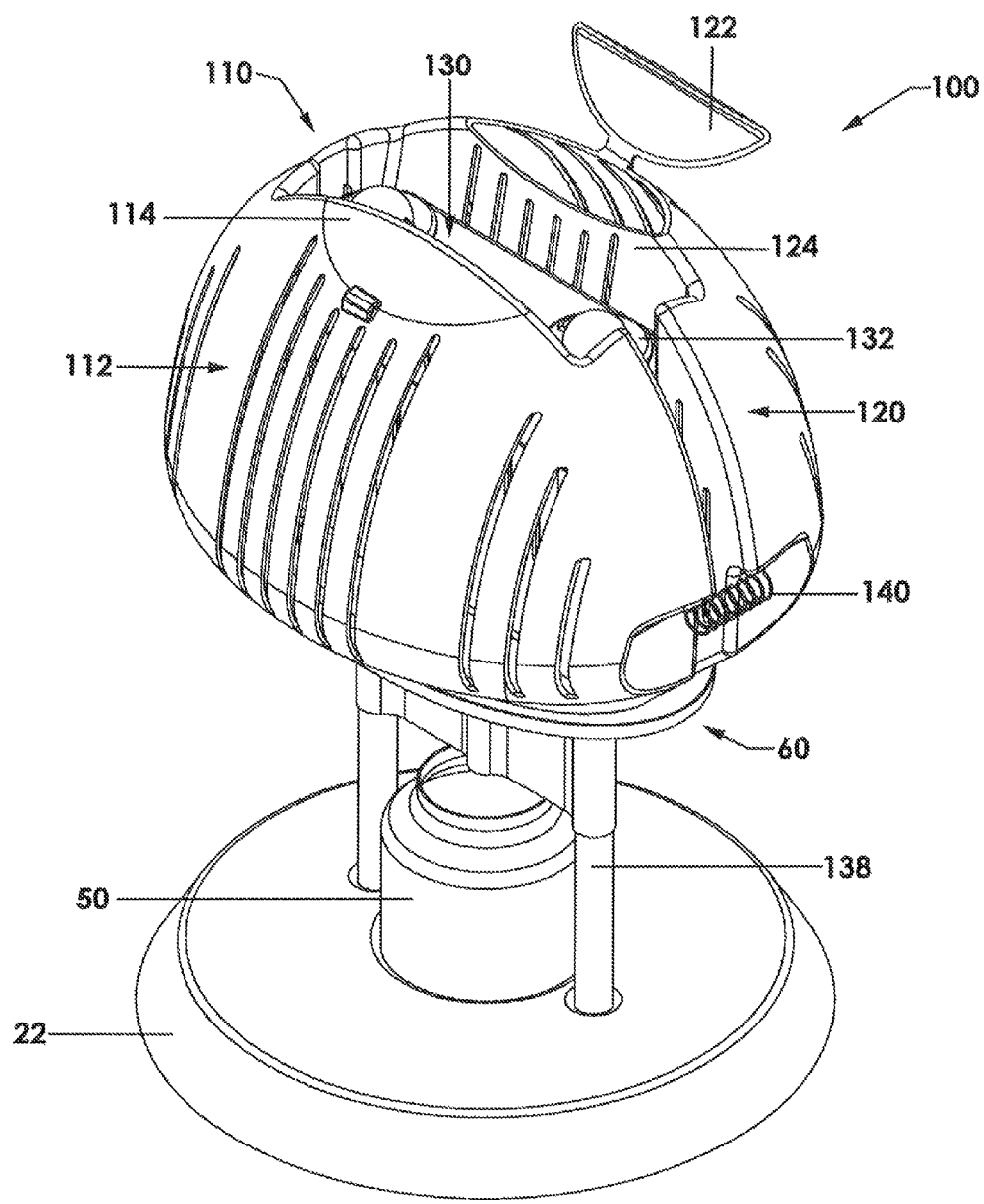
FIG. 6 is another perspective view of the drying apparatus as in FIG. 5, illustrated in an expanded configuration.
Figure 7A:
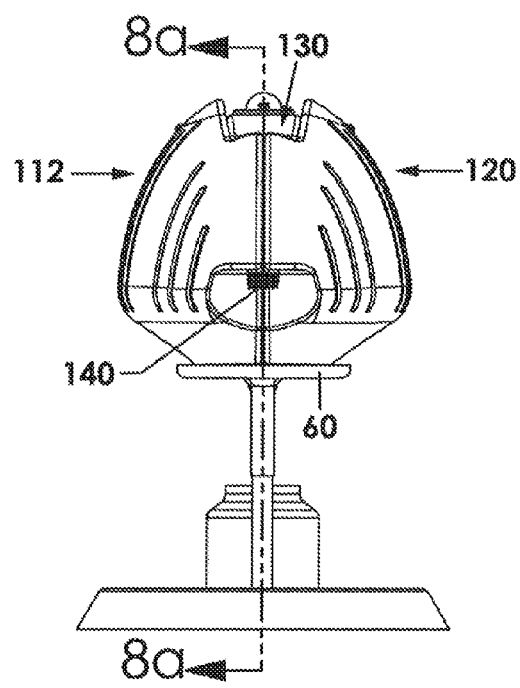
FIG. 7a is a side view of the drying apparatus as in FIG. 5.
Figure 7B:
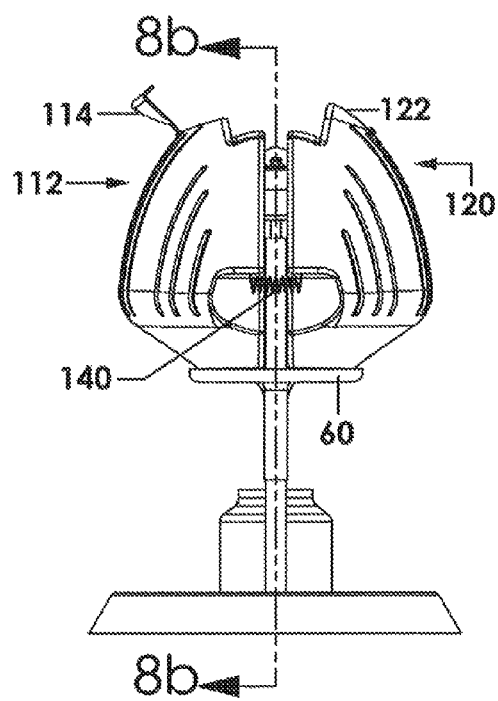
FIG. 7b is a side view taken along line as in FIG. 6.

More particularly, the main reservoir 110 includes a first portion 112 and a second portion 120. Each portion may have a generally hemispherical configuration although other shapes would also work. The second portion 120 may be operatively coupled to the first portion 112 with one or more tension springs 140 (FIG. 5). The tension springs 140 are normally biased to draw the main reservoir portions toward one another.

The main reservoir 110 defines an open top 111 as described previously. However, here each portion defines a respective portion of the open top 111. In other words, the first portion 112 of the main reservoir 110 defines a portion, e.g. half, of the open top and the second portion 120 of the main reservoir 110 defines a portion, e.g. the other half, of the open top. Then, the main reservoir 110 includes a first portion door 114 and a second portion door 122, each pivotally movable between open and closed configurations either providing or preventing access to the interior area of the main reservoir 110 in a manner substantially similar to the door 38 described above.

Figure 8A:
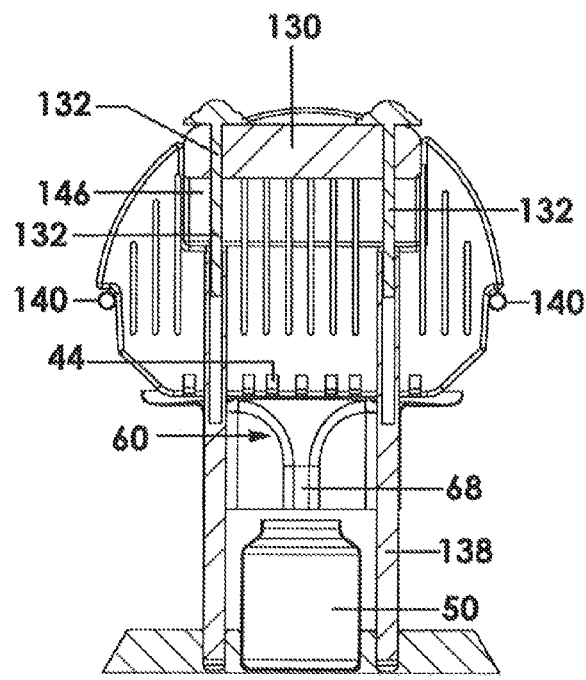
Figure 8B:
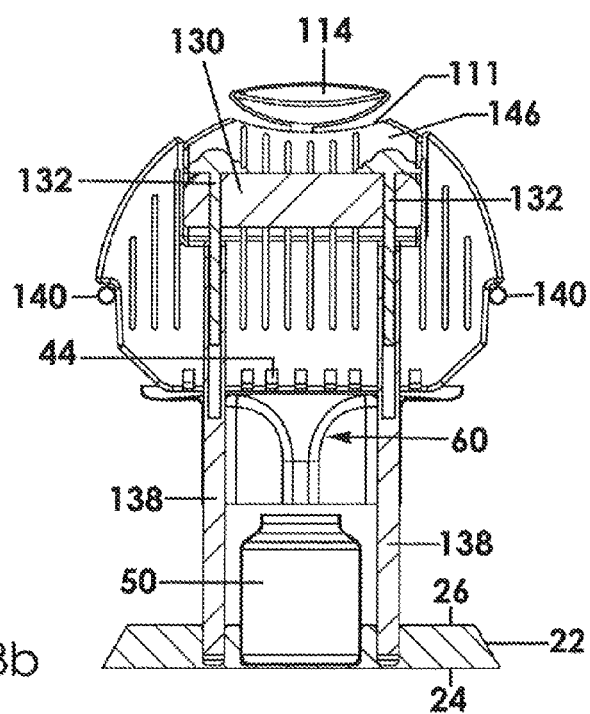
FIG. 8b is a sectional view taken along the line 8b-8b of FIG. 7b.
Figure 9:
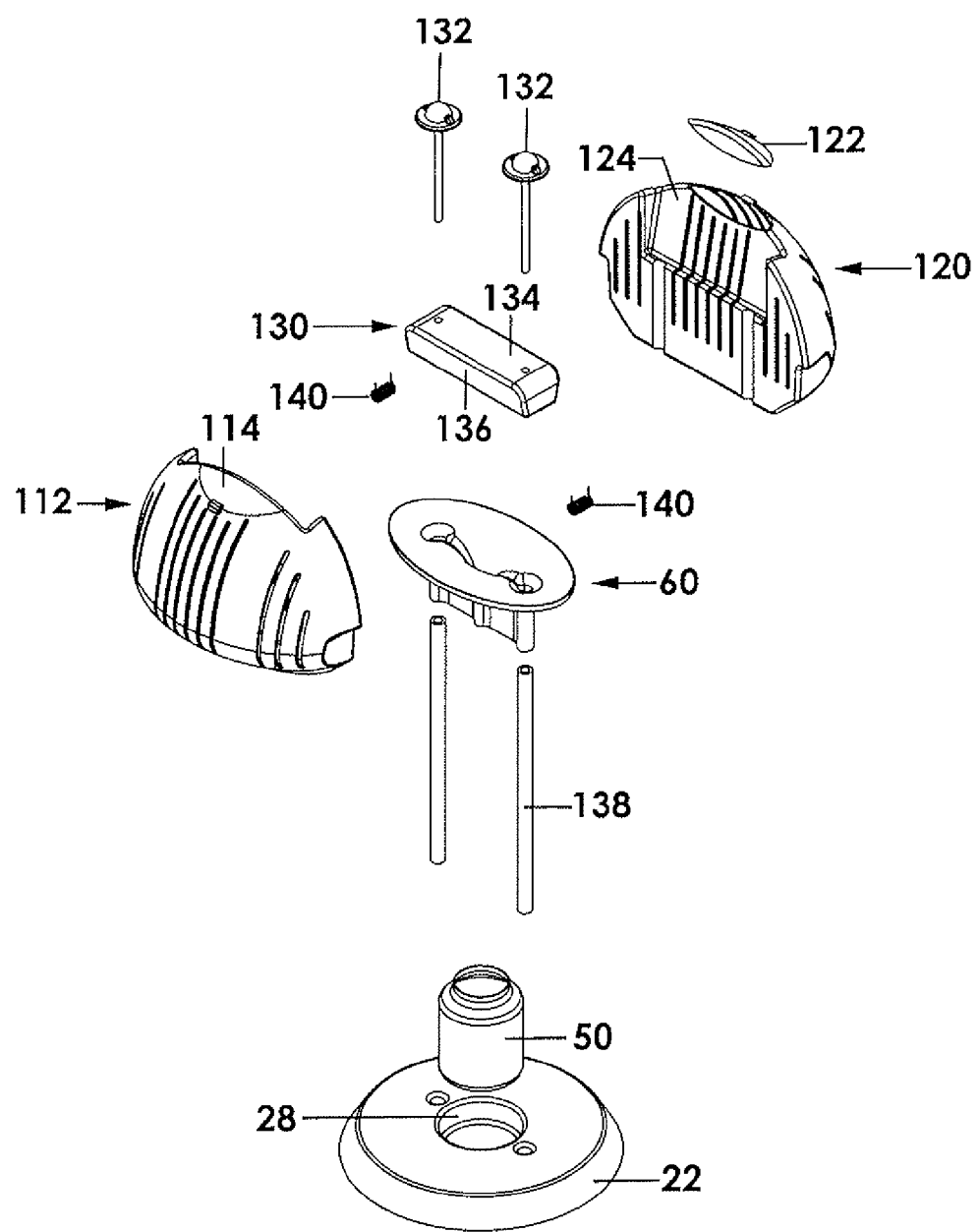
FIG. 9 is an exploded view of the drying apparatus as in FIG. 5.

In another aspect, the apparatus 100 includes a wedge member 130 situated in the interior area of the main reservoir 110 and is operatively configured to selectively displace the first portion 112 from the second portion 120, the wedge member 130 being accessible through the open top 111. More particularly, the wedge member 130 may include an upper portion 134 having a generally rectangular configuration and a lower portion 136 extending downwardly from the upper portion 134 (FIG. 9). The wedge member 130 may be coupled to respective upstanding support members 138 with threaded fasteners 132. For instance, the fasteners 132 shown in the drawings are screws that extend through the wedge member 130 and mate with respective support members 138, each fastener 132 configured such that the wedge member 130 is increasingly moved downwardly into the interior area of the main reservoir 110 as the fastener 132 is tightened relative to a respective support member 138 (FIG. 8b) and increasingly moved upwardly in the interior area as the fastener 132 is loosened relative to a respective support member 138 (FIG. 8a). It is understood that the first portion 112 and second portion 120 of the main reservoir 110 are increasingly urged away from each other, i.e. displaced, as the wedge member 130 is increasingly moved downwardly in the interior area and are urged toward one another, by action of the tension spring 140 (or springs), when the wedge member 130 is increasingly moved upwardly.

The first portion 112 of the main reservoir 110 includes an inner wall 116 adjacent the open top 111, a section of the inner wall 116 having a downwardly and inwardly sloping configuration (FIG. 9). Similarly, the second portion 120 of the main reservoir 110 includes an inner wall 124 adjacent the open top 111, a section of the inner wall 124 having a downwardly and inwardly sloping configuration. Stated another way, each inner wall 116, 124 is angled toward the opposing portion as it extends downwardly. As the wedge member 130 is moved downwardly in the interior area, the lower portion 136 of the wedge member 130 makes more contact with respective first 112 and second 120 portions between which the wedge member 130 is sandwiched such that the first 112 and second 120 portions are further displaced from one another. The tension springs 140 are moved toward an extended configuration when the wedge member 130 is moved downwardly in the interior area and are moved toward a retracted configuration when the wedge member 130 is moved upwardly in the interior area.

Accordingly, the embodiment of the drying apparatus 100 illustrated in FIGS. 5 to 9 and described above enables mathematical area of the main reservoir 110 to be expanded and able to support a larger helmet or other headgear. In use, a user may expand or retract the main reservoir 110 as described above so as to accommodate a small or large piece of headwear to be dried, such a football helmet or the like. Specifically, the fasteners 132 may be threadably tightened so as to move the wedge member 130 downwardly and displace the first portion 112 and second portion 120 of the main reservoir 110. With the headgear situated on the main reservoir, operation of the apparatus may be conducted as described above.

It is understood that while certain forms of this invention have been illustrated and described, it is not limited thereto except insofar as such limitations are included in the following claims and allowable functional equivalents thereof.

The invention claimed is:

1. A drying apparatus for use with moisture absorbing crystals that draw moisture out of ambient air, comprising:
   a main reservoir having a continuous side wall defining an interior area containing the moisture absorbing crystals;
   wherein said main reservoir includes a bottom wall defining an outlet aperture;
   a collection reservoir adjacent said bottom wall of said main reservoir, said collection reservoir defining an open top in operative communication with said outlet aperture of said main reservoir;
   a funnel member situated intermediate said bottom wall of said main reservoir and said collection reservoir, said funnel member configured to receive and direct a moisture stream generated by the moisture absorbing crystals from said outlet aperture into said collection reservoir;
   a framework including: a base having opposed lower and upper surfaces, said upper surface defining a recessed portion configured to removably receive said collection reservoir; a tubular support member extending upwardly from said upper surface; wherein said lower surface is configured to rest upon a support surface.

2. The drying apparatus as in claim 1, wherein: said support member includes a lower end coupled to said upper surface of said base and an upper end opposite said first end; and said support member has a generally hollow configuration.

3. The drying apparatus as in claim 1, wherein said funnel member includes an attachment portion coupled to said upper end of said support member such that said funnel member is upwardly displaced from said collection reservoir.

4. The drying apparatus as in claim 1, wherein said funnel member includes opposed lateral edges and defines a collection channel extending substantially between said lateral edges, said collection channel converging to define an funnel outlet.

5. The drying apparatus as in claim 1, wherein said side wall of said main reservoir defines a plurality of slits configured to allow ambient air into said interior area, whereby to interact with the moisture absorbent crystals.

6. The drying apparatus as in claim 3, wherein said side wall of said main reservoir defines a plurality of slits configured to allow ambient air into said interior area, whereby to interact with the moisture absorbent crystals.

7. The drying apparatus as in claim 5, wherein:
   said side wall of said main reservoir defines an open top;
   said main reservoir includes a door movable between an open configuration allowing access to said interior area through said open top and a closed configuration preventing access to said interior area of said main reservoir through said open top.

8. The drying apparatus as in claim 3, wherein:
   said support member is a pair of support members extending upwardly from said base of said framework;
   said funnel member includes a pair of attachment portions operatively coupled to respective second ends of said pair of support members.

9. The drying apparatus as in claim 1, wherein said side wall of said main reservoir includes a downwardly increasing exterior diameter configured to support headwear positioned thereon.

10. The drying apparatus as in claim 1, wherein:
    said side wall of said main reservoir defines an open top through which said interior area is accessible;
    said main reservoir includes a first portion and a second portion coupled to said first portion with a tension spring;
    a wedge member is positioned in said interior area of said main reservoir and accessible through said open top, said wedge member being threadably coupled to said support member with a fastener, said wedge member being increasingly moved downwardly into said interior area as said fastener is tightened relative to said support member and being increasingly moved upwardly in said interior area as said fastener is loosened relative to said support member.

11. The drying apparatus as in claim 10, wherein said wedge member is threadably coupled to said support member with a fastener, said wedge member being increasingly moved downwardly into said interior area as said fastener is tightened relative to said support member and being increasingly moved upwardly in said interior area as said fastener is loosed relative to said support member.

12. The drying apparatus as in claim 11, wherein said first portion and said second portion of said reservoir are increasingly urged away from one another when said wedge member is increasingly moved downwardly and increasingly urged toward one another by action of said spring when said wedge member is increasingly moved upwardly.

13. The drying apparatus as in claim 11, wherein:
said first portion includes a downwardly inwardly sloping inner wall adjacent said open top;
said second portion includes a downwardly inwardly sloping inner wall adjacent said open top;
said inner wall of said first portion and said inner wall of said second portion are configured to receive said wedge member therebetween such that said inner wall of said first portion and said inner wall of said second portion are urged away from one another when said wedge member is increasingly moved downwardly and urged toward one another by action of said spring when said wedge member is increasingly moved upwardly.

14. The drying apparatus as in claim 10, wherein said first portion and said second portion are normally biased toward one another by said tension spring.

15. The drying apparatus as in claim 11, wherein said tension spring is moved toward an extended configuration as said first portion and said second portion of said main reservoir are displaced by a downward movement of said wedge member and said tension spring is moved toward a relaxed configuration as said first portion and said second portion of said main reservoir are moved closer together by an upward movement of said wedge member.

16. The drying apparatus as in claim 10, wherein said side wall of said main reservoir defines a plurality of spaced apart slits configured to allow ambient air into said interior area, whereby to interact with the moisture absorbent crystals.

17. The drying apparatus as in claim 10, wherein:
said first portion of said main reservoir includes a first portion door movable between an open configuration allowing access to said interior area through said portion of said open top defined by said first portion of said main reservoir and a closed configuration preventing access to said interior area of said main reservoir through said portion of said open top defined by said first portion of said main reservoir; and
said second portion of said main reservoir includes a second portion door movable between an open configuration allowing access to said interior area through said portion of said open top defined by said second portion of said main reservoir and a closed configuration preventing access to said interior area of said main reservoir through said portion of said open top defined by said second portion of said main reservoir.

18. The drying apparatus as in claim 10, wherein said side wall of said main reservoir includes a downwardly increasing exterior diameter configured to hold headwear positioned thereon.

* * * * *